Sept. 18, 1934.  O. ELFSTROM  1,974,020
ANIMAL TRAP
Filed Sept. 20, 1933  3 Sheets-Sheet 1

Inventor
Otto Elfstrom
By Clarence A. O'Brien
Attorney

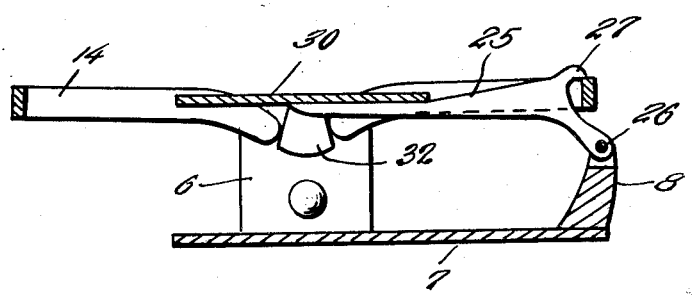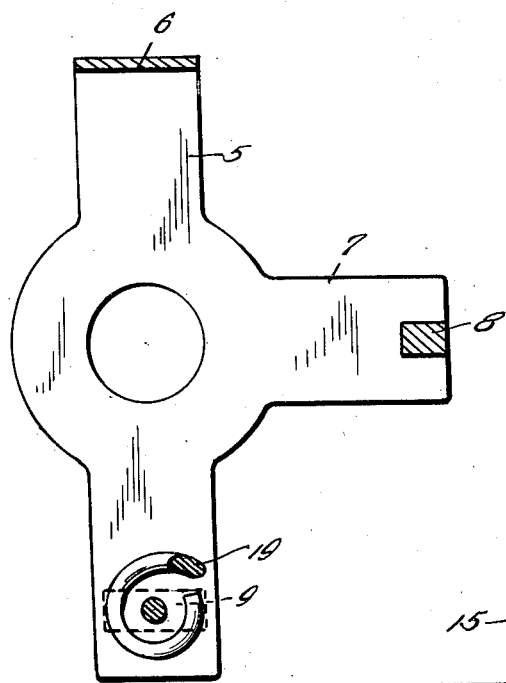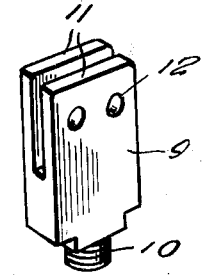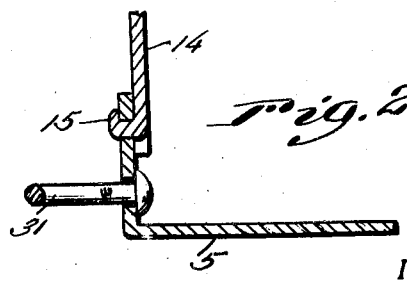

Sept. 18, 1934.     O. ELFSTROM     1,974,020
ANIMAL TRAP
Filed Sept. 20, 1933     3 Sheets-Sheet 3
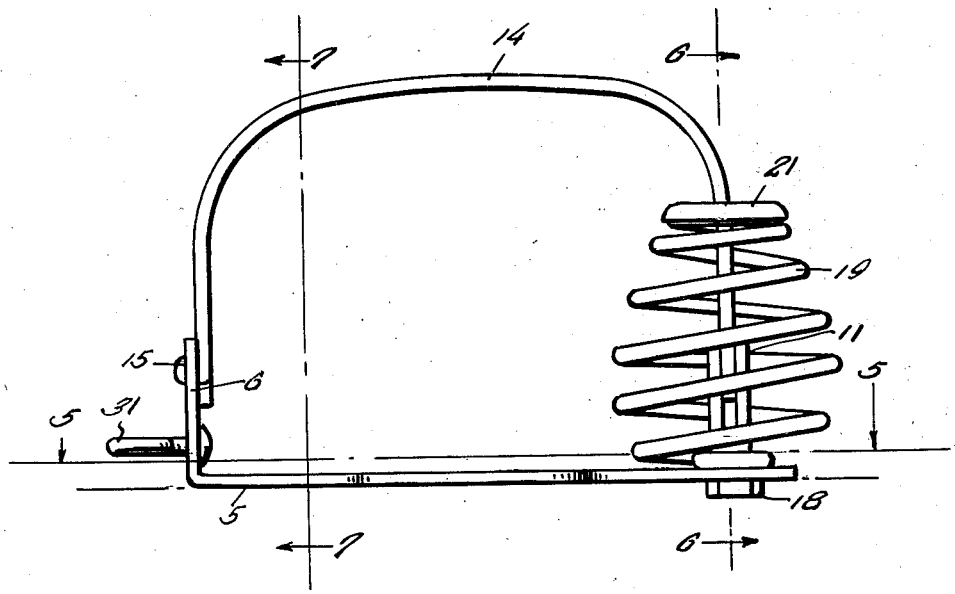
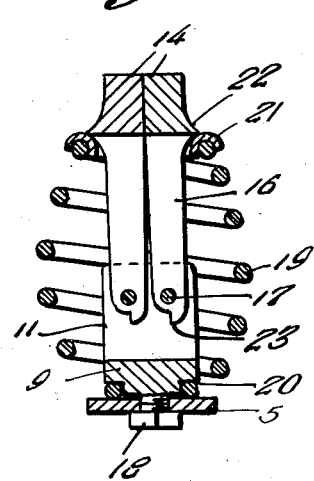
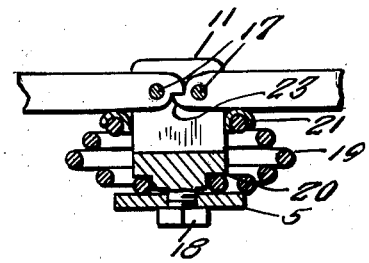
Inventor
Otto Elfstrom
By Clarence A. O'Brien
Attorney Patented Sept. 18, 1934

1,974,020

UNITED STATES PATENT OFFICE 1,974,020

ANIMAL TRAP

Otto Elfstrom, Cordova, Territory of Alaska

Application September 20, 1933, Serial No. 690,278

1 Claim. (Cl. 43—88)

The present invention relates to an animal trap and more particularly to that type wherein the jaw members thereof are quickly and firmly swung to a closed position by the use of a coil spring rather than the more commonly used leaf spring.

The object of the invention resides in the provision of an animal trap of this nature which is simple in its construction, inexpensive to manufacture, easy to manipulate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 3 is a side elevation of the trap showing the same sprung.

Figure 4 is a sectional view taken substantially on the line 4—4 of Figure 1.

Figure 5 is a horizontal section taken substantially on the line 5—5 of Figure 3.

Figure 6 is a vertical section taken substantially on the line 6—6 of Figure 3.

Figure 7 is a vertical section taken substantially on the line 7—7 of Figure 3.

Figure 8 is a detail section taken substantially on the line 8—8 of Figure 1, and Figure 9 is a perspective view of the detachable lug.

Figure 1:
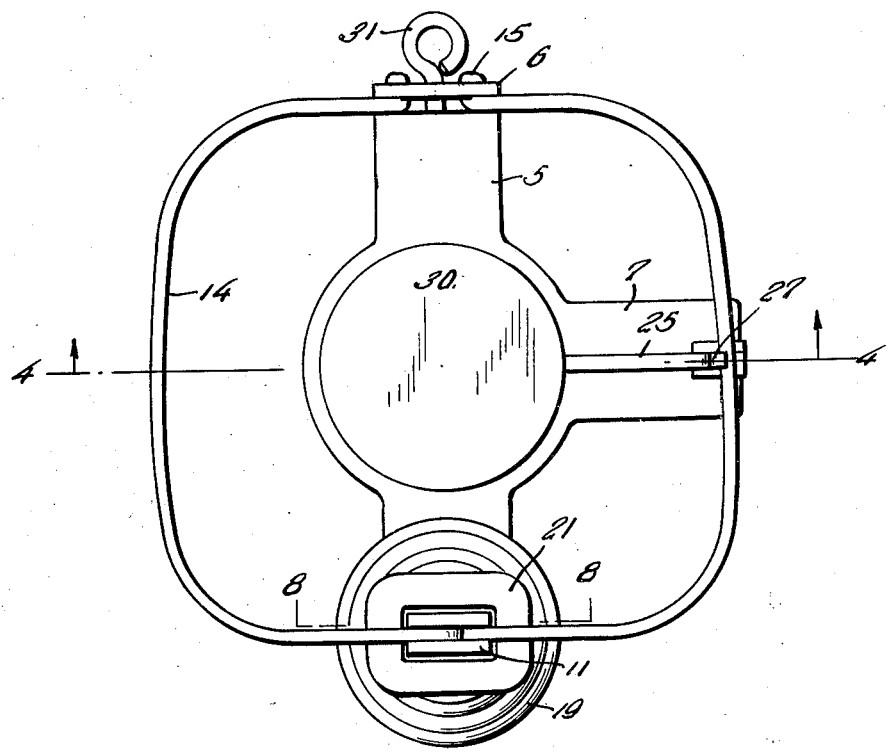
Figure 1 is a top plan view of the trap showing the same set.
Figure 2:
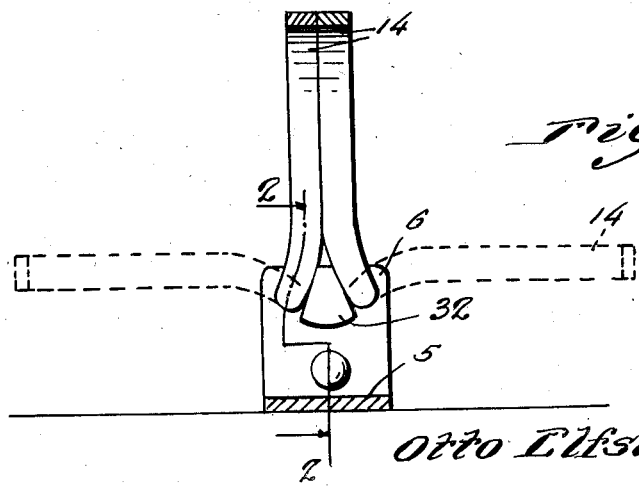
Figure 2 is a detail sectional view taken substantially on the line 2—2 of Figure 7.

Referring to the drawing in detail it will be seen that the numeral 5 denotes an elongated base having rising from one end thereof an ear 6. From the central portion of the base extends a coplanar wing 7 from the end of which rises an integral stud 8. Numeral 9 denotes a detachable lug having on its bottom end a threaded stud 10 to engage in an opening in the other end of the base 5 so that the lug rises therefrom. The lug is bifurcated to provide furcations 11 disposed in spaced coextensive parallelism and having each a pair of bolt openings 12.

Numerals 14 denote a pair of jaws. Each jaw is of a somewhat U-shaped formation having a laterally and outwardly disposed trunnion 15 on one end journalled in an opening in the ear 6 and having its terminal bent as indicated to advantage in Figure 3 so as to prevent the accidental removal thereof. The other end of each jaw has an extension 16 the end of which is disposed between the furcations 11 and rockable on a pin or bolt 17 mounted in the opening 12. The lug 9 is securely held on the base by the nut 18. A coil spring 19 is disposed about the lug and the extensions 16. The lower convolute of the spring is engaged between a shoulder 20 of the lug 9 and the base 5. The upper convolute of the spring is seated in a channel of a ring 21 adapted to abut shoulders 22 formed on the jaws 14 at their juncture with the extensions 16. On the ends of the extensions 16 are formed shoulders 23 arranged so as to overlap one another as shown in Figure 8 when the jaws are in set position and the coil spring is retracted under tension. This coil spring 19 is of the type which tapers from its center toward both ends.

A catch 25 is rockably engaged as at 26 on the stud 8 and has an extension 27 to engage over the central portion of one of the jaws when in set position, this being the jaw which has the shoulder 23 which is engaged under the other shoulder whereby both jaws are held in set position. A base platform 30 is mounted on the catch 25 and of course when the animal bears down on this trap plate 30 the catch 25 is swung to release the extension 27 and the spring is free to spring the jaws to trapping position. The detachable feature of the lug 9 enables one to easily and quickly replace the spring 19 whenever necessary. A lug 32 is connected to the inner face of the ear 6, said lug having upwardly converging sides and the lug extends between the outwardly curved lower ends of the two jaws, as shown more particularly in Figure 7. This lug acts to keep the jaws from moving sidewise when the jaws are gripping a part of an animal, which might result in the release of the animal.

It is thought that the construction, operation, utility and advantages of this invention will now be clearly understood in its practical features. As a rule it is desirable to chain or otherwise anchor a trap of this nature and I provide an eye 31 on the ear 6 for this purpose.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A trap of the class described comprising a base including a ring-shaped part and three arms extending from said part, two of the arms being oppositely arranged and the other arm extending at right angles from the plane of said other two arms, each arm having an upright part at its outer end, a pair of jaws pivotally supported by the uprights of the oppositely arranged arms, a spring resting on one of the last mentioned arms and engaging the jaws for closing the jaws, a lug on the inner face of the upright of the other first mentioned arm and the pivoted ends of the jaws curving away from each other for forming a space in which the lug extends when the jaws are in raised position, an arm pivoted to the upright of the third arm and extending inwardly, a pan on the inner end of this arm located over the opening formed by the ring-shaped part of the base, and a curved upwardly extending projection on the outer end of said arm for engaging one of the jaws for holding the jaws in open position, means whereby the last mentioned jaw will hold the other jaw in open position when said last mentioned jaw is held in open position, and a swivel connected with the upright to which the lug is attached.

OTTO ELFSTROM.